Feb. 21, 1967   E. B. DUNCAN   3,305,061
AXIAL LOCKING CLUTCH
Filed Dec. 16, 1964
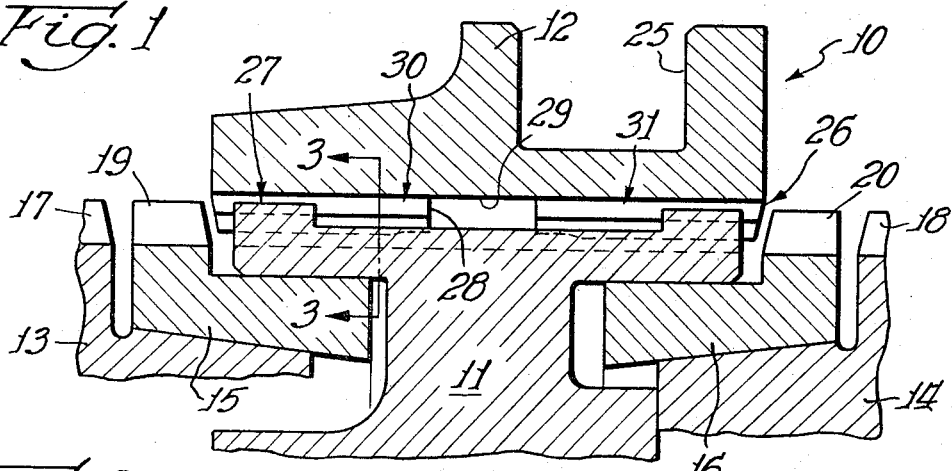
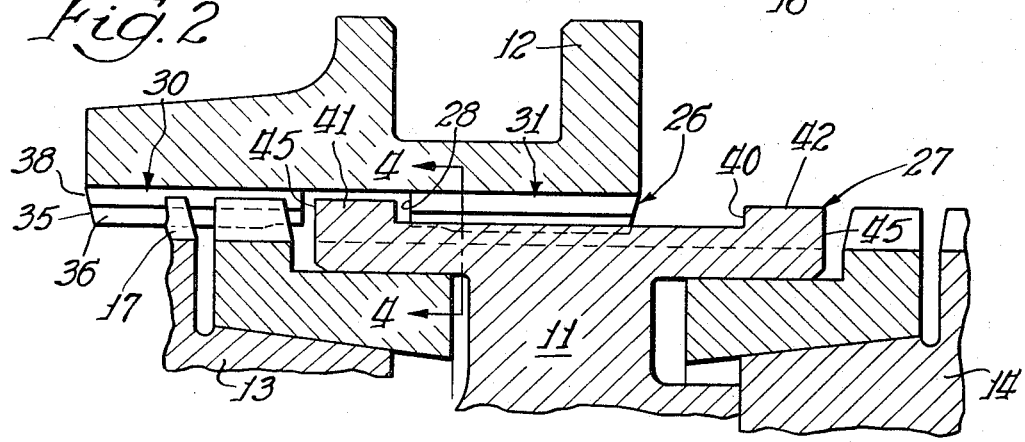
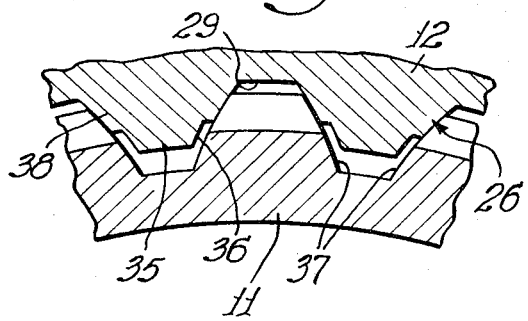
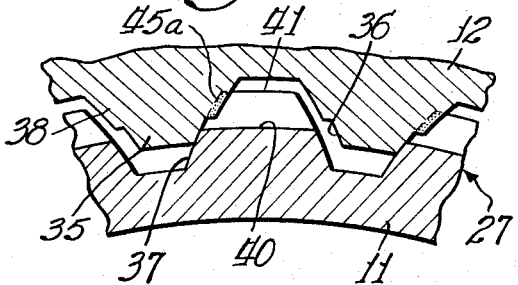
Inventor:
Emmett Duncan
By: Robert L. Zieg Atty.

United States Patent Office 3,305,061
Patented Feb. 21, 1967

**3,305,061
AXIAL LOCKING CLUTCH**
Emmett B. Duncan, Muncie, Ind., assignor to Borg-Warner Corporation, Chicago, Ill., a corporation of Illinois
Filed Dec. 16, 1964, Ser. No. 418,752
4 Claims. (Cl. 192—114)

This invention relates to positive toothed clutches of the type comprising a slidable sleeve member as used in synchronizers and other torque transmitting applications.

One of the problems encountered in transmissions where high torque loads are to be transmitted is that when a positive clutch element is used, as for example in a synchronizer structure which is slidably mounted to engage a gear in a transmission, the slidable clutch element may tend to come out of engagement with the mating clutch teeth on the gear when under high torque loads. Various solutions have been presented in the prior art to lock the sliding sleeve member of the synchronizer or clutch axially when the clutch engagement has been made to prevent the clutch from coming out of engagement. The solutions presented by the prior art, although solving the axial locking problem, provide structures which are difficult and expensive to manufacture.

Accordingly, it is an object of the present invention to provide a positive clutch, including a sliding member to engage the clutch, with an axial locking means which will prevent the sliding member from coming out of engagement under high torque loads while maintaining a structural design of the clutch parts which may be easily and economically manufactured.

The invention consists of the novel constructions, arrangements and devices to be hereinafter described and claimed for carrying out the above stated objects and such other objects as will appear from the following description of preferred embodiments of the invention illustrated with reference to the accompanying drawings wherein:

FIGURE 1 is a longitudinal sectional view of a synchronizer clutch embodying the principles of the invention;

FIGURE 2 is a view similar to FIGURE 1 showing the sleeve member of the synchronizer shifted to engage a gear;

FIGURE 3 is a sectional view taken along the line 3—3 of FIGURE 1; and

FIGURE 4 is a sectional view taken along the line 4—4 of FIGURE 2 showing the positions of the parts when transmitting torque.

Referring to FIGURE 1 a portion of a transmission is illustrated comprising a clutch mechanism 10 which includes a hub or annular member 11 for transmitting torque between a shaft (not illustrated) and a clutch sleeve or annular member 12 slidably mounted on the hub 11. Portions of the second and third speed gears of a transmission for example, gears or rotary parts 13 and 14 are illustrated. Synchronizer rings 15 and 16 are provided which have frictional engagement with mating areas of the respective gears 13 and 14.

The synchronizer mechanism which co-acts with the synchronizer rings 15 and 16 to synchronize the gears before engagement is not illustrated since it is not a part of the present invention and furthermore the present invention may be used in applications for making a positive clutch connection where a synchronizer structure is not used. For a full disclosure of the synchronizer structure referred to reference may be had to the White et al. Patent No. 2,221,900 of common assignee.

Gears 13 and 14 have clutch teeth 17 and 18 respectively thereon adapted to be engaged by the clutch sleeve member 12 to provide a positive driving connection between the hub 11 and gear 13 or gear 14. Synchronizer rings 15 and 16 have gear teeth 19 and 20 thereon which are functional in the synchronizing operation (not described herein).

The clutch sleeve 12 has a large outer annular groove 25 formed therein adapted to be engaged by a shifting fork (not illustrated) for moving the clutch sleeve. The clutch sleeve includes internal teeth 26 which intermesh with external teeth 27 formed on the hub member 11. The internal teeth 26 on the clutch sleeve 12 have an annular groove 28 formed therein extending to the root of the teeth as indicated at 29. Forming the groove 28 in teeth 27 provides full toothed portions 30 and 31 on either side of the groove 28.

The outer portions of the teeth 26 on the sleeve 12 are relieved or cut down to form recessed sections 35 in the teeth. The recessed sections extend to a depth approximately one-half the distance from the outer part of the teeth to the tooth root at 29. The teeth 26 have sections 38 of full width extending between the recessed sections and the tooth root at 29. The recessed sections 35 are of reduced thickness as compared to full width sections 38.

Surfaces 36 are provided on teeth 26 in the area of recessed sections 35 and are formed on the same involute tooth curve as the full width sections 38 of the teeth 26 and therefore on the same involute as used in forming the teeth 27 on the hub member 11.

The teeth 27 on the hub 11 have an annular groove 40 formed in the outer diameter thereof which extends approximately one-half of the depth of the teeth 27. Forming of the groove 40 in the teeth 27 in the hub 11 provides full tooth portions 41 and 42 on either side of the groove 40. The hub member 11 has axial end faces 45 thereon.

Referring to FIGURE 2, the clutch sleeve 12 is illustrated shifted to the left to engage the clutch teeth 17 on the gear 13. It will be seen that the groove 28 in the clutch sleeve 12 is slightly wider than the full tooth portion 41 on the left side of hub 11.

The operation of the axial locking clutch of the present invention is as follows: when the clutch sleeve 12 is shifted to the left or right for example as illustrated in FIGURE 2, the recessed sections 35 of the teeth 26 on the clutch sleeve 12 allow the clutch sleeve 12 to be displaced in a rotational sense with respect to the hub 11 an amount corresponding to one-half the difference in width between recessed sections 35 and full width sections 38 until the surfaces 36 on the teeth 26 engage a corresponding gear surface 37 on the hub 11 in the area of the groove 40. When the clutch sleeve 12 shifts rotationally with respect to the hub 11 an axial locking engagement will occur which will prevent the clutch sleeve 12 from moving out of engagement with the gear 13 until a torque reversal occurs.

As the clutch sleeve 12 tries to move back to the right out of engagement with the gear 13 when under torque load full width sections 38 on teeth 26 will engage the shaded portion 45a of teeth 27 on the axial end face 45 on the left side of the full tooth portion 41 in FIGURE 4 and prevent further movement.

Since the surfaces 36 of the gear teeth 26 in the area of recessed sections 35 are formed on the same involute or curve as the surfaces on the other portions of the gear teeth both on the sleeve 12 and the hub 11 a full-form tooth contact will occur along the axial length of the full toothed portion 31 of the teeth 26 in the zone of engagement between teeth 26 and 27, namely, in the area of groove 40 on hub 11 when the clutch sleeve is moved along to engage gear 13. Thus high torques can still be transmitted without distortion of the gears since full-form tooth contact is obtained along the axial length of the teeth 26 in the area of groove 40 even though there is no driving contact between the teeth 26 and 27 in the upper area of the teeth 27 when the clutch sleeve 12 is shifted to engage one of the gears.

From the above it will be apparent that applicant has provided an axial locking clutch of simple construction which can be easily manufactured. The recessed sections 35 in the clutch sleeve 12 can be economically formed by broaching or similar process and the grooves 28 and 40 are easily cut into the members 12 and 11. Due to the simpleness of the design a standard synchronizer transmission structure can be remade to include the axial locking feature without the addition of parts. All that is required is that the recessed sections 35 be formed in the teeth of the clutch sleeve and that the grooves 28 and 40 be cut in the clutch sleeve and the hub 11.

Thus applicant has provided an economical solution to the problem of synchronizer or other type of clutches coming out of engagement when under high torque loads by means of a positive lock of the clutch sleeve.

I wish it to be understood that the invention is not to be limited to the specific constructions, arrangements and devices shown and described except only insofar as the claims may be so limited as it will be apparent to those skilled in the art that changes may be made without departing from the principles of the invention.

I claim:

1. In a clutch mechanism, a hub member with teeth thereon, a sleeve member encircling said hub having teeth meshing with the teeth on said hub to provide a torque transmitting connection, a rotary part adjacent said hub member, said sleeve member being axially slidable with respect to said hub member to engage said rotary part, a groove formed in the teeth of said sleeve member, said teeth on said sleeve member having a recessed section formed therein on the inner radial portion of said teeth only and allowing rotational displacement of said sleeve member with respect to said hub member whereby when said sleeve member is axially displaced to engage said rotary part and said members are transmitting torque, said rotational displacement will provide an axial engagement between said teeth on the members in the area of said groove to prevent said sleeve member from moving out of engagement with said rotary part.

2. In a clutch mechanism, a first annular member with teeth thereon, a second annular member encircling said first annular member having teeth meshing with the teeth on said first annular member to provide a torque transmitting connection, a rotary part adjacent said hub member, said second annular member being axially slidable with respect to said first annular member to engage said rotary part, grooves formed in the teeth of each of said members, said teeth of said members having full toothed portions on either side of said grooves, means on the inner radial portion only of said teeth of said second annular member allowing rotational displacement of said second annular member with respect to said first annular member whereby when said second annular member is axially displaced to engage said rotary part and said members are transmitting torque one of said full toothed portions on each of said members will be axially located completely within the area of the groove on the other member so that said rotational displacement will provide an axial engagement between said teeth on the members in the area of said groove in said second annular member to prevent said member from moving out of engagement with said rotary part.

3. In a clutch mechanism, a hub member with teeth thereon, a sleeve member encircling said hub member having teeth meshing with the teeth on said hub member to provide a torque transmitting connection, a rotary part adjacent said hub member, said sleeve member being axially slidable with respect to said hub member to engage said rotary part, grooves formed in the teeth of each of said hub members, said teeth of said members having full toothed portions on either side of said grooves, the teeth on said sleeve member having recessed sections formed therein extending approximately one-half the depth of said teeth allowing rotational displacement of said sleeve member with respect to said hub member whereby when said sleeve member is axially displaced to engage said rotary part and said members are transmitting torque, one of said full toothed portions on each of said members will be axially located completely within the area of the groove on the other member so that said rotational displacement will provide an axial locking action which will take place between the full toothed portions on said members in the area of the groove on said sleeve member to prevent said sleeve member from moving out of engagement with said rotary part.

4. In a clutch mechanism, a hub member with teeth thereon, a sleeve member encircling said hub member having teeth meshing with the teeth on said hub member to provide a torque transmitting connection, a rotary part adjacent said hub member, said sleeve member being axially slidable with respect to said hub member to engage said rotary part, engaging surfaces on the teeth of said members, grooves formed in the teeth of each of said members, said teeth of said members having full toothed portions on either side of said grooves, the teeth on said sleeve member having recessed sections formed therein extending approximately one-half only of said teeth on the inner radial portion thereof, allowing rotational displacement of said sleeve member with respect to said hub member, the engaging surface of said teeth on the sleeve member in the area of said recess being formed on the same curve as the surfaces of said teeth on said hub member whereby there will be full form tooth contact in the area of engagement of said teeth on said members when said sleeve member is axially displaced to engage said rotary part and said members are transmitting torque and whereby one of said full toothed portions on each of said members will be axially located completely within the area of the groove on the other member so that said rotational displacement will provide an axial engagement between said teeth on the members in the area of said groove and prevent said sleeve member from moving out of engagement with said rotary part.

References Cited by the Examiner
UNITED STATES PATENTS

| | | | |
|---|---|---|---|
| 2,398,407 | 4/1946 | Brownyer | 192—114 X |
| 2,846,038 | 8/1958 | Brownyer | 192—114 X |
| 3,043,414 | 7/1962 | Peras | 192—114 |
| 3,219,164 | 11/1965 | Henyon | 92—114 |

References Cited by the Applicant
UNITED STATES PATENTS

| | | |
|---|---|---|
| 2,070,140 | 2/1937 | Peterson et al. |

DAVID J. WILLIAMOWSKY, *Primary Examiner.*
BENJAMIN W. WYCHE, *Examiner.*